United States Patent [19]

Wallace

[11] Patent Number: 4,815,702
[45] Date of Patent: Mar. 28, 1989

[54] GATE VALVE WITH POPPET CLOSURE

[76] Inventor: Charles C. Wallace, 231 Paris St., San Francisco, Calif. 94112

[21] Appl. No.: 158,599

[22] Filed: Feb. 22, 1988

[51] Int. Cl.⁴ ............................................. F16K 3/18
[52] U.S. Cl. ...................................... 251/175; 251/82
[58] Field of Search ..................... 251/82, 84, 167, 175

[56] References Cited

U.S. PATENT DOCUMENTS

| | | | |
|---|---|---|---|
| 1,548,634 | 8/1925 | Schiller | 251/175 |
| 2,750,962 | 6/1956 | Kreitchman | 251/175 X |
| 2,941,779 | 6/1960 | Saar | 251/175 |
| 3,768,774 | 10/1973 | Baugh | 251/175 |

FOREIGN PATENT DOCUMENTS

| | | | |
|---|---|---|---|
| 3208359 | 9/1983 | Fed. Rep. of Germany | 251/175 |
| 234073 | 4/1969 | U.S.S.R. | 251/175 |

Primary Examiner—Robert G. Nilson
Attorney, Agent, or Firm—Chernoff, Vilhauer, McClung & Stenzel

[57] ABSTRACT

A gate valve which prevents the accumulation of pressure within the valve housing when closed is disclosed. The device employs poppets which are located on both sides of a shuttle carried in the gate structure and movable transversely thereto. The shuttle fits in the gate structure in a manner to facilitate the communication of fluid throughout the valve housing so as to equalize, in the closed position, pressure throughout the valve housing, with upstream line pressures. The device also is reversely operable to respond to pipeline backflow.

8 Claims, 1 Drawing Sheet

U.S. Patent     Mar. 28, 1989     4,815,702
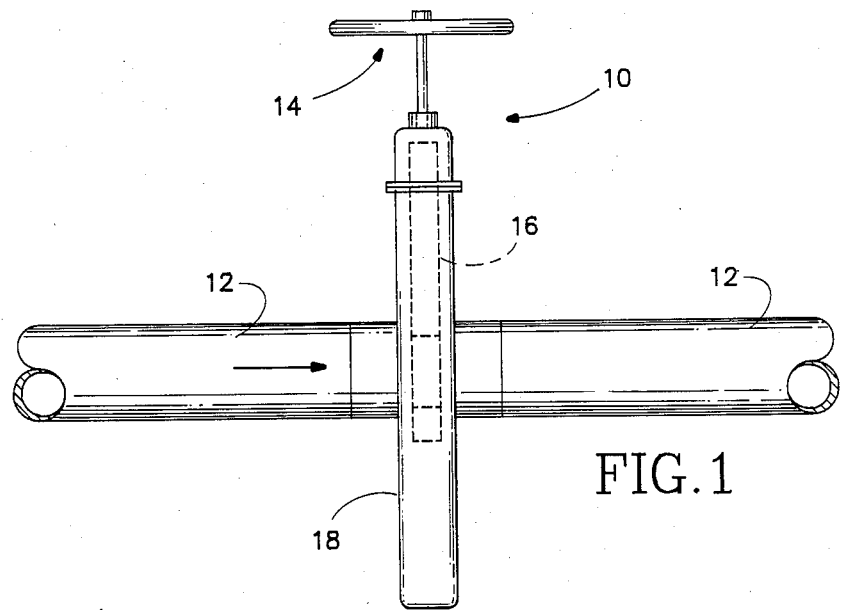
FIG.1
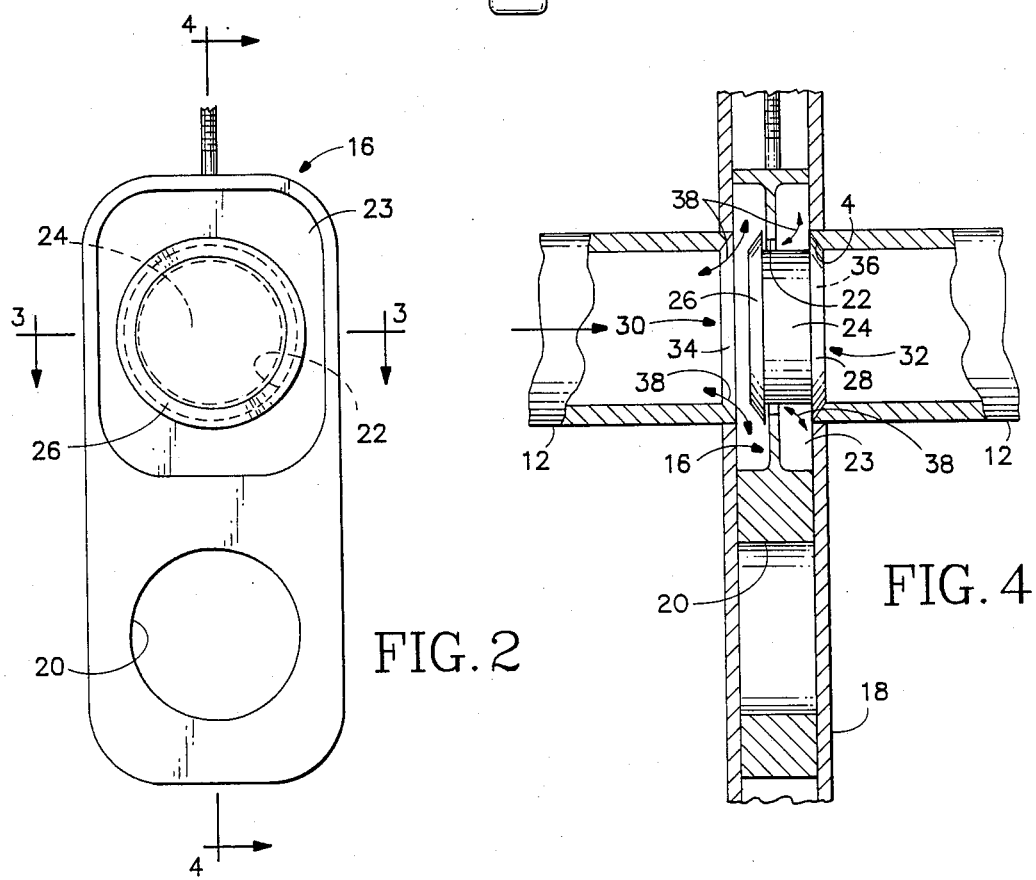
FIG.2
FIG.4
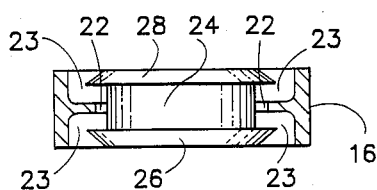
FIG.3

GATE VALVE WITH POPPET CLOSURE

BACKGROUND OF THE INVENTION

The present invention is directed to an improvement in gate valves which prevents undesired and potentially distructive pressure build up within the gate housing. The invention is particularly suited for above-ground petroleum pipelines and for use in environments subject to extreme temperature fluctuations.

Prior art gate valves for use in cutting off flow in a petroleum line, as shown for example in Baugh U.S. Pat. No. 3,768,774, include a housing which extends both above and below the pipeline. Within the housing is a valve gate having an opening which is aligned with the interior of the pipeline when the gate valve is in its fully opened position. The gate is guided, normally, by the interior surfaces of the gate housing and is movable by means of a hand wheel and jack screw arrangement.

A typical cause of failure of such prior art valves is the expansion of oil trapped within the gate housing as a result of temperature changes, which expansion can cause greatly increased internal pressure when the gate valve is in its closed position, with the gate faces blocking the pipe in both directions from the gate.

SUMMARY OF THE INVENTION

The present invention is directed to a gate valve which when closed permits the unrestricted communication of fluid throughout the gate housing with the fluid in the upstream pressurized portion of the pipeline so as to prevent the occurrence of pressure above that of the upstream pipeline within the valve gate housing.

The present invention is also directed to an improved gate valve, operable with upstream pressure originating from either direction which, when closed, fully and reliably seals the face of the gate with the downstream portion of the valve body.

The need for a pressure-releaving valve housing is satisfied by employing a poppet closure carried by a shuttle which is slidably mounted in a port extending through the gate structure and movable transversely thereto. The dimensions of the shuttle and poppets are selected so that when one poppet is seated in a valve seat located in the downstream opening of the valve housing, the opposite poppet and shuttle permit fluid flow within the housing and between the housing and the fluid on the upstream side of the valve.

The need for a secure and reliable closure which is reversely operable is achieved by employing a transversely movable shuttle having opposing poppet faces which are beveled at their perimeter to provide seating of the downstream poppet face which provides a positive connection of increased surface area between the poppet and the valve seat.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view of an exemplary embodiment of a gate valve in accordance with the present invention in use with a petroleum pipeline.

FIG. 2 is a front view of a gate structure constructed in accordance with the present invention.

FIG. 3 is a sectional view taken along line 3—3 of FIG. 2.

FIG. 4 is a fragmentary side elevation view, partly broken away, of a gate valve constructed in accordance with the present invention.

DETAILED DESCRIPTION OF THE INVENTION

Referring to the drawings, wherein like numerals refer to the same elements, and in particular to FIG. 1, a preferred embodiment of the present invention is shown as comprising a gate valve 10 connected to a petroleum pipeline 12 for opening and closing a flow of petroleum, indicated by directional arrows in FIGS. 1 and 4, therein. The valve 10 includes a handwheel and jack screw arrangement 14 for positioning a gate structure 16 within a gate housing 18 with the gate structure being guided by the interior surface of the housing. Located on one side of the gate housing is an upstream side opening 30 and located on the other side of the gate housing is downstream side opening 32. While the valve is referred to as having an upstream side and a downstream side in order to assist in the description of how it operates, it will be understood that the valve is reversible and will accommodate flow in either direction.

Referring also to FIG. 2, the gate structure 16 has two ports passing through it which can be alternately aligned with the inlet and outlet openings. The first port 20 is of substantially the same diameter as the inlet and outlet openings and the interior of pipeline 12 and is aligned therewith when the gate structure 16 is in its fully open position. Each side of gate structure 16 has a recessed sink 23 which is formed around the perimeter of second port 22, as best seen in FIG. 3. The sink on the downstream side of the gate structure, when closed, serves in part as a reservoir for accumulated fluid between the gate housing 18 and the downstream face of gate structure 16. The second port 22 has a diameter which is similar to the diameter of the first port and has a shuttle 24 slidably mounted within. The shuttle 24 is essentially a disk with a diameter which is less than the diameter of the port 22 so as to create a gap sufficient for petroleum to flow therebetween. Secured to the upstream and downstream sides of the shuttle 24 are a pair of opposed poppets 26, 28. The poppets are substantially circular disks having diameters which are greater than the diameter of the second port 22, thereby retaining the shuttle 24 in the second port. Both poppets are positioned within a respective sink 23 of gate structure 16 and have beveled perimeters which converge in the direction of their respective side openings 30 and 32. The poppets 26, 28 are beveled to form seating surfaces which engage upstream and downstream valve seats 34, 36 which are located in the housing. The valve seats 34, 36 are preferably conical and sealingly mate with the beveled face of their associated poppet when the shuttle is urged toward that valve seat. The shuttle is long enough to prevent contact between the upstream poppet 26 and the gate structure 16 when the downstream poppet is seated in its valve seat and vice versa. In addition, the shuttle is short enough to prevent simultaneous contact by both poppets 26, 28 with their respective valve seats 34, 36.

In operation the gate valve 10 is closed by a clockwise rotation of the handwheel and jack screw arrangement 14 which lowers the gate structure 16 so as to align the second port 22 with the upstream and downstream side openings 30, 32. The force of the upstream pressure against the face of the upstream poppet 26 moves the shuttle 24 transversely of the gate structure 16 thereby forcing the downstream poppet 28 to sealingly engage the downstream valve seat 36 as shown in FIG. 4. The engagement of the downstream poppet 28 and valve seat 36 stops the flow of petroleum into the downstream side opening 32 thereby interrupting the petroleum flow through pipeline 12. The space between the shuttle 24 and the second port 22 is such that petroleum in the upstream sink 23 of the gate structure is free to communicate between the shuttle 24 and gate structure 16, as shown by the arrows 38, so as to maintain a pressure on both sides of gate structure 16 equal to the upstream pressure in the petroleum pipeline 12. Thus, no petroleum is trapped within the gate housing 18 where it could cause damage if it expanded due to temperature changes. The gate valve 10 is opened by a counterclockwise rotation of the handwheel and jack screw arrangement 14 which raises the gate structure 16 so as to align the first port 20 with the upstream and downstream side openings 30, 32 thereby allowing the flow of petroleum to pass uninterrupted through the gate valve.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A gate valve for in-line placement in a pipe comprising:
    (a) a housing having an upstream side opening and a downstream side opening;
    (b) a gate structure separating said upstream side opening from said downstream side opening, slidably mounted within said housing, and having a first port and a second port defined therein;
    (c) means for moving said gate structure so as to alternatively position either said first port portion or said second port portion in communication with said side openings;
    (d) a shuttle which slideably translates in said second port, the cross-sectional area of said shuttle being less than the cross-sectional area of said second port;
    (e) an upstream poppet and a downstream poppet, said poppets being attached to said shuttle on opposite sides of said gate structure and being dimmensioned to prevent their passing through said second port;
    (f) an upstream valve seat defined in said housing around the periphery of said upstream side opening, and a downstream valve seat defined in said housing around the periphery of said downstream side opening; and
    (g) means for seating said downstream poppet in said downstream valve seat so as to fluidly seal said downstream side opening when the pressure acting against said upstream poppet is greater than the pressure acting against said downstream poppet and for seating said upstream poppet in said upstream valve seat so as to fluidly seal said upstream side opening when the pressure acting against said downstream poppet is greater than the pressure acting against said upstream poppet.

2. The device of claim 1 wherein said gate structure has recessed sinks defined in opposite sides thereof proximate said second port, wherein each of said sinks are arranged to receive a respective one of said poppets.

3. The device of claim 1 wherein said upstream and said downstream side openings of said housing and said first and second ports of said gate structure are substantially circular.

4. The device of claim 2 wherein said upstream and said downstream poppets are substantially circular disks having a diameter which is greater than the diameter of said second port.

5. The device of claim 3 wherein said upstream and said downstream poppets each have a beveled perimeter of converging slope in the direction of said upstream and said downstream side openings.

6. The device of claim 4 wherein said valve seats include conical seating surfaces which sealingly fit with said poppets.

7. The device of claim 2 wherein said shuttle is substantially cylindrical and has a diameter which is less than the diameter of said second port.

8. The device of claim 1 wherein the length of said shuttle is such that when one of said poppets is seated in its respective valve seat the opposite poppet is spaced apart from said gate structure.

* * * * *

UNITED STATES PATENT AND TRADEMARK OFFICE
CERTIFICATE OF CORRECTION

PATENT NO.  : 4,815,702

DATED       : March 28, 1989

INVENTOR(S) : Charles C. Wallace

It is certified that error appears in the above-identified patent and that said Letters Patent is hereby corrected as shown below:

| | |
|---|---|
| Col. 1, line 7 | Change "distructive" to --destructive-- |
| Col. 1, line 40 | Change "pressure-releaving" to --pressure-relieving-- |
| Col. 4, line 5 | Change "dimmensioned" to --dimensioned-- |
| Col. 4, line 6 | After "said" delete -- - -- |

Signed and Sealed this

Twentieth Day of November, 1990

*Attest:*

HARRY F. MANBECK, JR.

*Attesting Officer*    *Commissioner of Patents and Trademarks*